US012384669B1

(12) United States Patent

Smith

(10) Patent No.: US 12,384,669 B1
(45) Date of Patent: Aug. 12, 2025

(54) BEVERAGE CONTAINER PIERCING DEVICE

(71) Applicant: Shane Lucas Smith, Bellbrook, OH (US)

(72) Inventor: Shane Lucas Smith, Bellbrook, OH (US)

( * ) Notice: Subject to any disclaimer, the term of this patent is extended or adjusted under 35 U.S.C. 154(b) by 73 days.

(21) Appl. No.: 18/378,640

(22) Filed: Oct. 10, 2023

Related U.S. Application Data

(60) Provisional application No. 63/378,881, filed on Oct. 9, 2022.

(51) Int. Cl.
*B67B 7/86* (2006.01)

(52) U.S. Cl.
CPC .................................... *B67B 7/28* (2013.01)

(58) Field of Classification Search
CPC .................................. B67B 7/26; B67B 7/28
See application file for complete search history.

(56) References Cited

U.S. PATENT DOCUMENTS

| | | | | |
|---|---|---|---|---|
| 5,630,529 A * | 5/1997 | Chlupp | B67D 3/0083 | 222/88 |
| 5,941,419 A * | 8/1999 | Molinary | B65D 83/182 | 222/83.5 |
| 8,740,030 B2 * | 6/2014 | Purdy | A62B 3/005 | 225/103 |
| 9,856,123 B1 * | 1/2018 | Mantz | B65D 25/48 | |
| D885,832 S | 6/2020 | Wilens et al. | | |
| 10,947,097 B2 * | 3/2021 | Clifton | B67B 7/28 | |
| 10,961,101 B2 * | 3/2021 | Clark | B67B 7/26 | |
| D917,718 S | 4/2021 | Livingston et al. | | |
| D923,813 S | 6/2021 | Livingston et al. | | |
| 11,518,663 B1 * | 12/2022 | Widmann | B67B 7/26 | |
| D1,049,787 S | 11/2024 | Reaux | | |
| 2005/0167454 A1 | 8/2005 | Botero et al. | | |
| 2009/0230141 A1 * | 9/2009 | Haney | B67B 7/28 | 220/745 |
| 2016/0054592 A1 | 2/2016 | Ianelli | | |
| 2024/0262670 A1 | 8/2024 | Widmann | | |

* cited by examiner

*Primary Examiner* — Donnell A Long
(74) *Attorney, Agent, or Firm* — Thomas E. Lees, LLC

(57) ABSTRACT

A drinking apparatus includes a body portion comprising a receptacle having and inner cavity a dimensioned to receive and retain a beverage container inserted in an upright orientation within the inner cavity, the body portion having a lower area providing access to the inner cavity; a piercing mechanism located near the lower area and insertable through the access to the inner cavity; a ratcheting mechanism located adjacent to the first portion and connected to the piercing mechanism under tension, the ratcheting mechanism drawing the piercing mechanism through the access and into the inner cavity, thus piercing the beverage container; and a spout located proximate to the piercing mechanism and configured to pour a beverage from the pierced beverage container.

20 Claims, 8 Drawing Sheets

BEVERAGE CONTAINER PIERCING DEVICE

RELATED APPLICATIONS

This application claims priority to U.S. provisional patent application Ser. No. 63/378,881, entitled BEVERAGE CONTAINER PIERCING DEVICE, filed on Oct. 9, 2022, and is incorporated herein by reference in its entirety.

BACKGROUND OF THE INVENTION

Drinking beer or other liquid rapidly through a hole punctured in the bottom of an aluminum beverage can is a practice commonly referred to as "shotgunning." "Shotgunning" a beer or other liquid involves piercing a hole in the bottom section of an aluminum can, then opening the can using the pull tab, and finally, quickly consuming the beverage through the hole poked in the bottom of the can. The hole in the can is typically made with a sharp object like a car key, a knife, or a can-opener. This practice is typically done in a group of people, with participants racing to see who can drink the beer or other liquid the fastest. It is usually viewed as a drinking game or party activity. This common game can be improved using modern methods to facilitate the piercing of the can and the nature of the way the game itself is played.

SUMMARY OF THE INVENTION

The present subject matter relates to a device that punctures a beverage can containing liquid, allowing the contents to flow quickly from the can for the user of the device to consume. In its preferred embodiment, the device is used in the context of a game. Participants in the game take turns passing the device between participants until the device punctures the can of liquid, and the final participant consuming the entire contents of the can.

In its preferred method of use, the game is played as follows: The first player holds the device with one hand and pulls the movable spout. The spout moves outward from the main circular body of the device until it is locked into its extended position. The same player then inserts their canned beverage of choice completely inside the main body of the device. The device has now been prepared and loaded, and the game is ready to begin. The first player begins the game by holding the device upright, and twisting the bottom, rotating base of the device counterclockwise until exactly one audible clicking noise can be heard coming from inside the device. The first player ceases to twist the rotating base of the device and passes the device to the next player. The next player then turns the rotating base of the device in the same direction as the first player, until exactly one audible click is produced by the device. Play continues in this fashion, with each player proceeding to twist the rotating base of the device producing an audible click which ends their turn. Eventually, one player will twist the rotating base and cause the spout to quickly withdraw inward towards the center of the device, into its retracted position. This player is known as the Loser. This rapid retraction of the spout causes the beverage can to be punctured by the pointed tip of the movable spout. The beverage inside the can quickly begins pouring out of the hole in the movable spout, via the circular channel of the main body. To facilitate a faster rate of flow of the liquid, the Loser who triggers the spout to puncture the can then opens the top of the can via the pull tab or other available method. Once the liquid is flowing quickly from the spout, the loser "shotguns", or drinks as quickly as possible, the liquid as fast as they can, until the can is empty. Once the loser has consumed as much liquid from the can as they are able, the game ends. The losing player, or another player then pulls the movable spout again locking it into its extended position. This causes the pointed tip of the spout to exit the empty beverage can. The empty beverage can is then able to be removed from the main body of the device. Once the empty beverage can has been removed from the device, a full beverage can is able to be re-inserted into the main body of the device, and the game can begin again. If the players no longer wish to play the game, the spout can be triggered into its retracted position by twisting the rotating base by as many clicks as are necessary to retract the movable spout.

The intention of the game is to have the rotating base of the device produce a seemingly random number of audible clicks from the beginning of the game, until the beverage can is punctured, every time the game is played. The method of producing the seemingly random number of clicks is discussed below.

The game can be played in many different methods other than the preferred method as described above. One example of a variation on the way the game is played is as follows: Instead of each player twisting the rotating base of the device until only one audible click is heard, each player may throw a six-sided dice before their turn begins, and proceed to produce an audible number of clicks equal to the resulting number shown on the dice.

Other features and advantages of the present invention will become apparent to the reader upon reading the following detailed description, when considered in conjunction with the accompanying drawings . . .

This view shows an embodiment of the device without the liquid containing beverage can inserted into the main body of the device.

Figure 1:
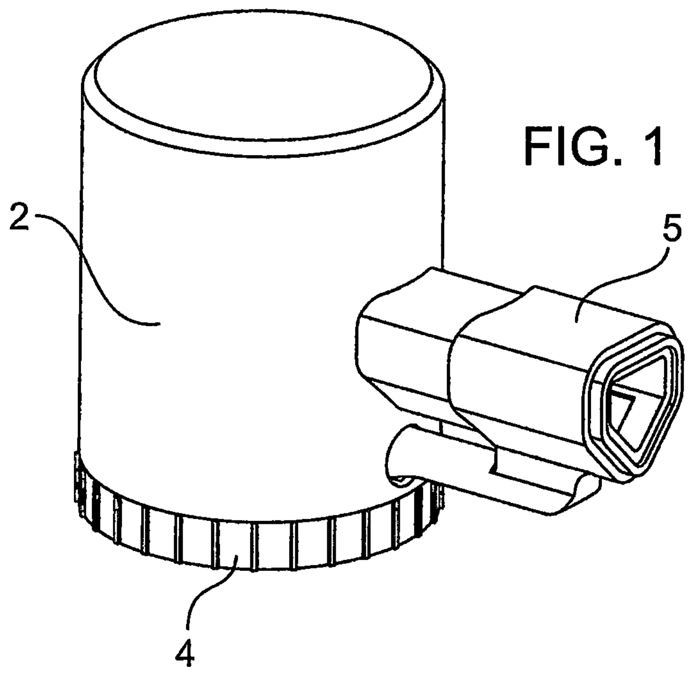
FIG. 1 is an upper perspective view of an embodiment of the device.
Figure 2:
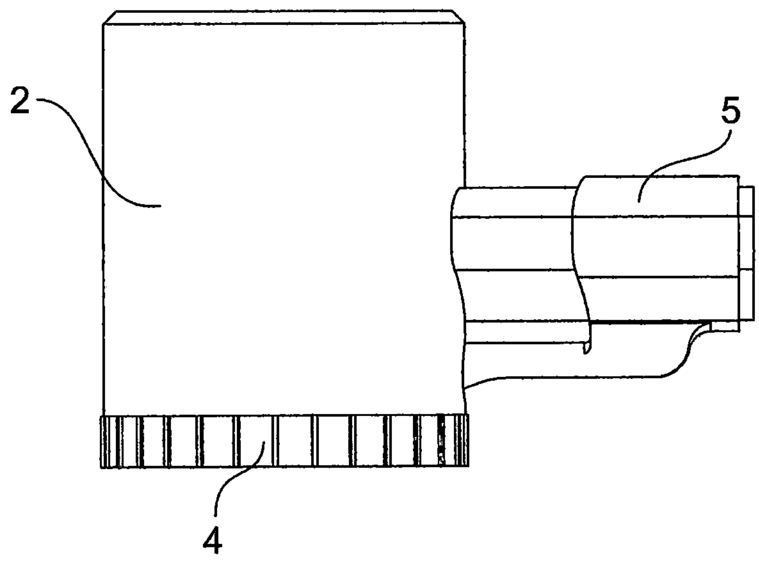
FIG. 2 is a side perspective view of an embodiment of the device.
Figure 3:
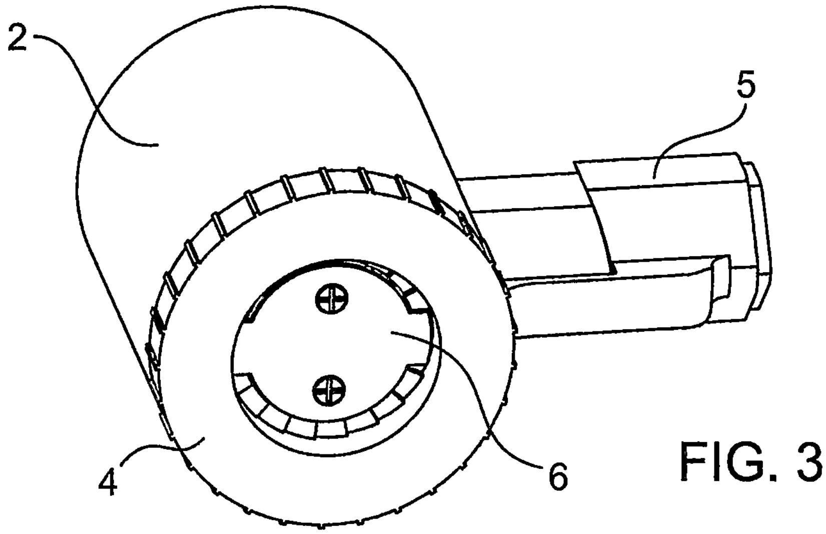
FIG. 3 is a lower perspective view of an embodiment of the device.
Figure 4:
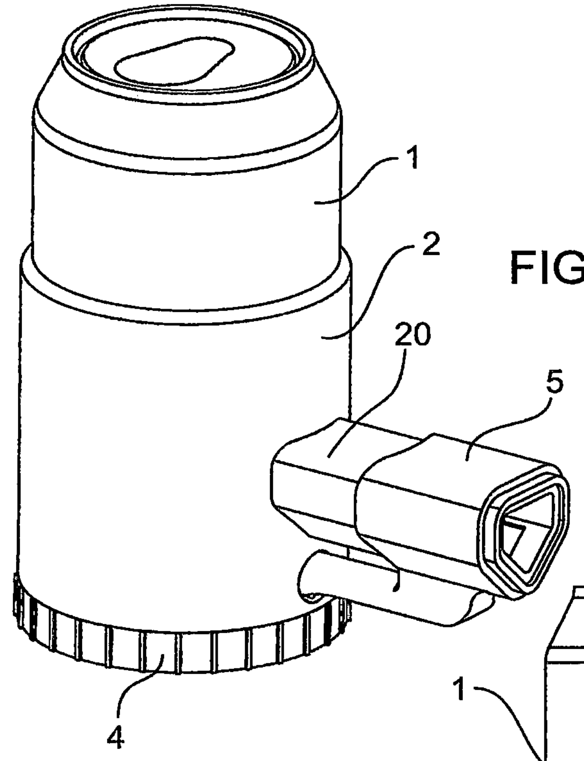
FIG. 4 is an upper perspective view of an embodiment of the device with a beverage container inserted into the device.
Figure 5:
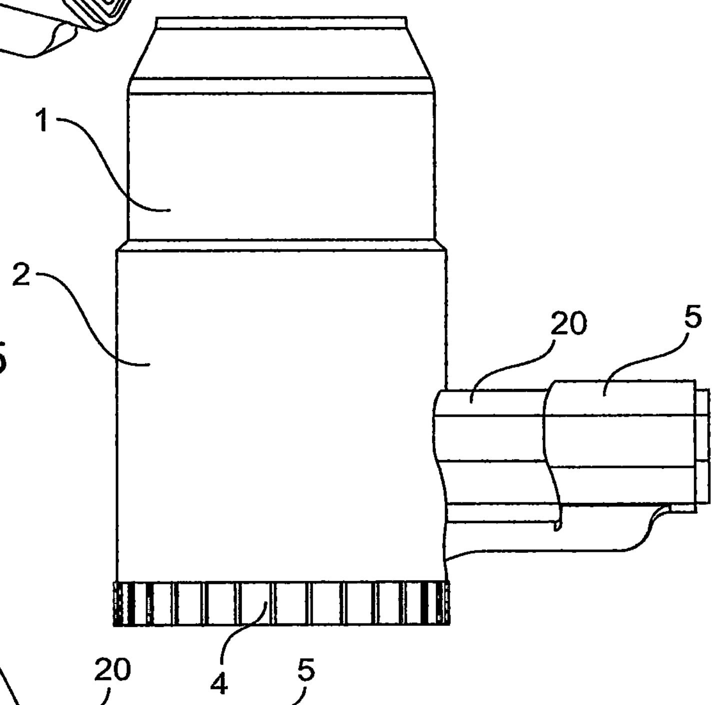
FIG. 5 is a side perspective view of an embodiment of the device with a beverage container inserted into the device.
Figure 6:
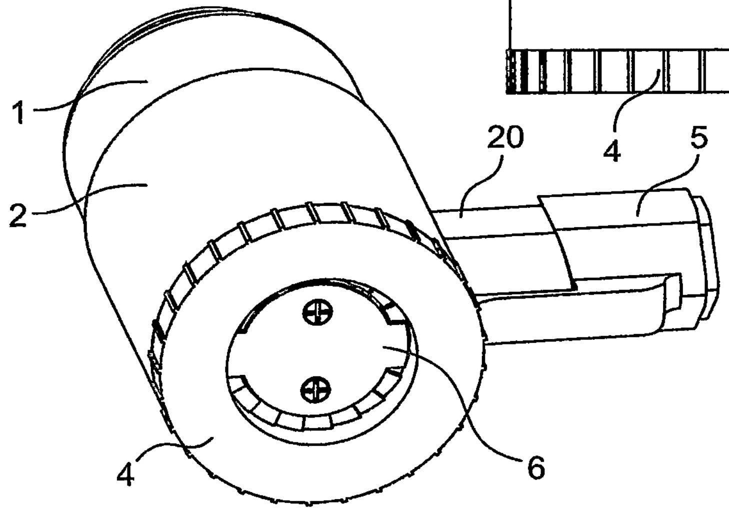
FIG. 6 is a lower perspective view of an embodiment of the device with a beverage container inserted into the device.
Figure 7:
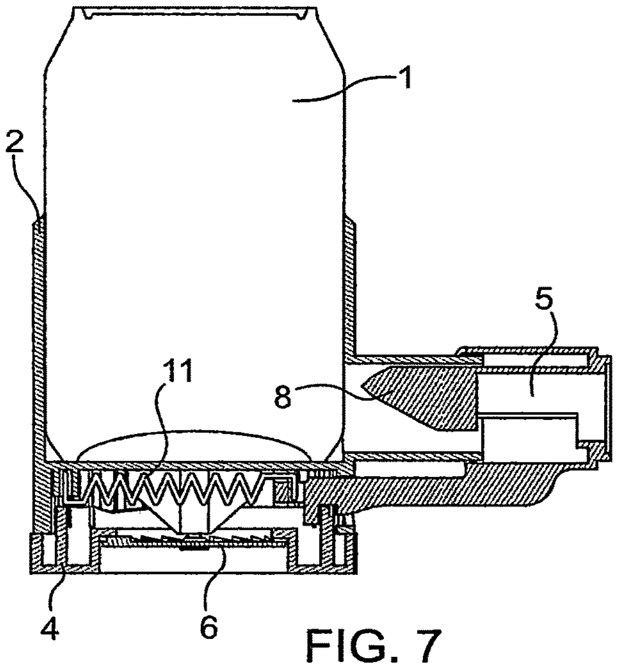
FIG. 7 is a half section side view of an embodiment of the device with the movable spout in its extended position. This view shows an embodiment of the device with the liquid containing beverage can inserted into the main body of the device.
Figure 8:
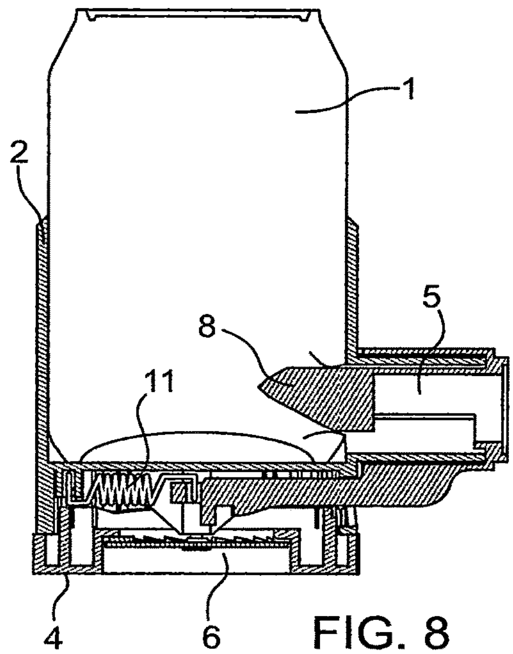
FIG. 8 is a half section side view of an embodiment of the device with the movable spout in its retracted position. This view shows an embodiment of the device with the liquid containing beverage can inserted into the main body of the device.
Figure 9:
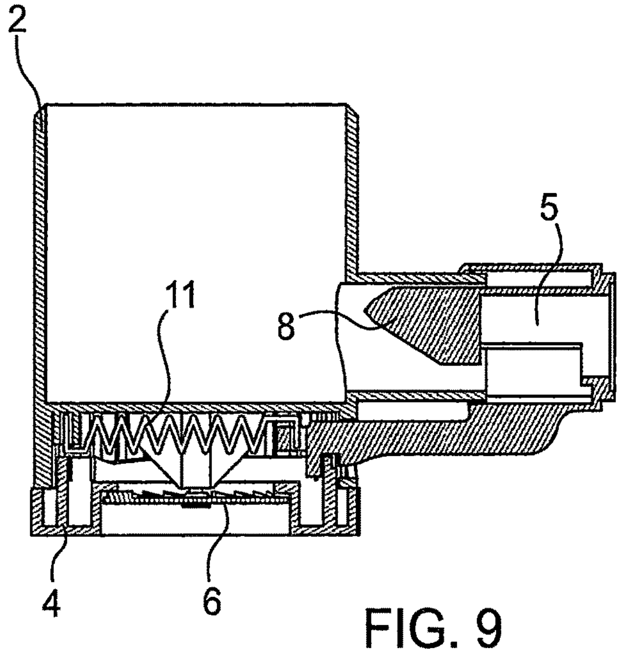
FIG. 9 is a half section side view of an embodiment of the device with the movable spout in its extended position. This view shows an embodiment of the device without the liquid containing beverage can inserted into the main body of the device.
Figure 10:
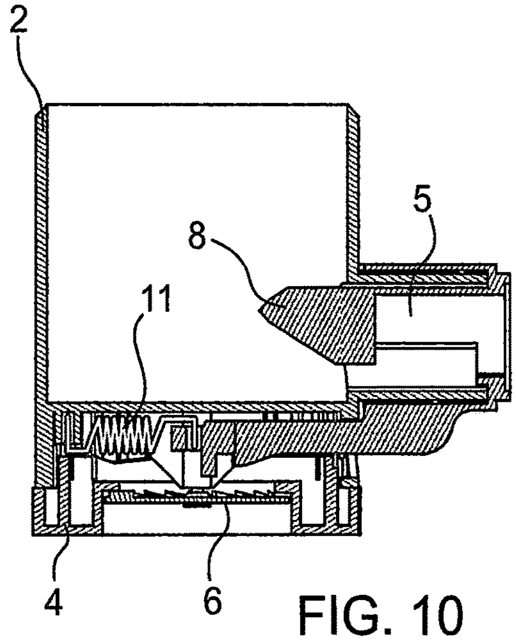
FIG. 10 is a half section side view of an embodiment of the device with the movable spout in its retracted position.
Figure 11:
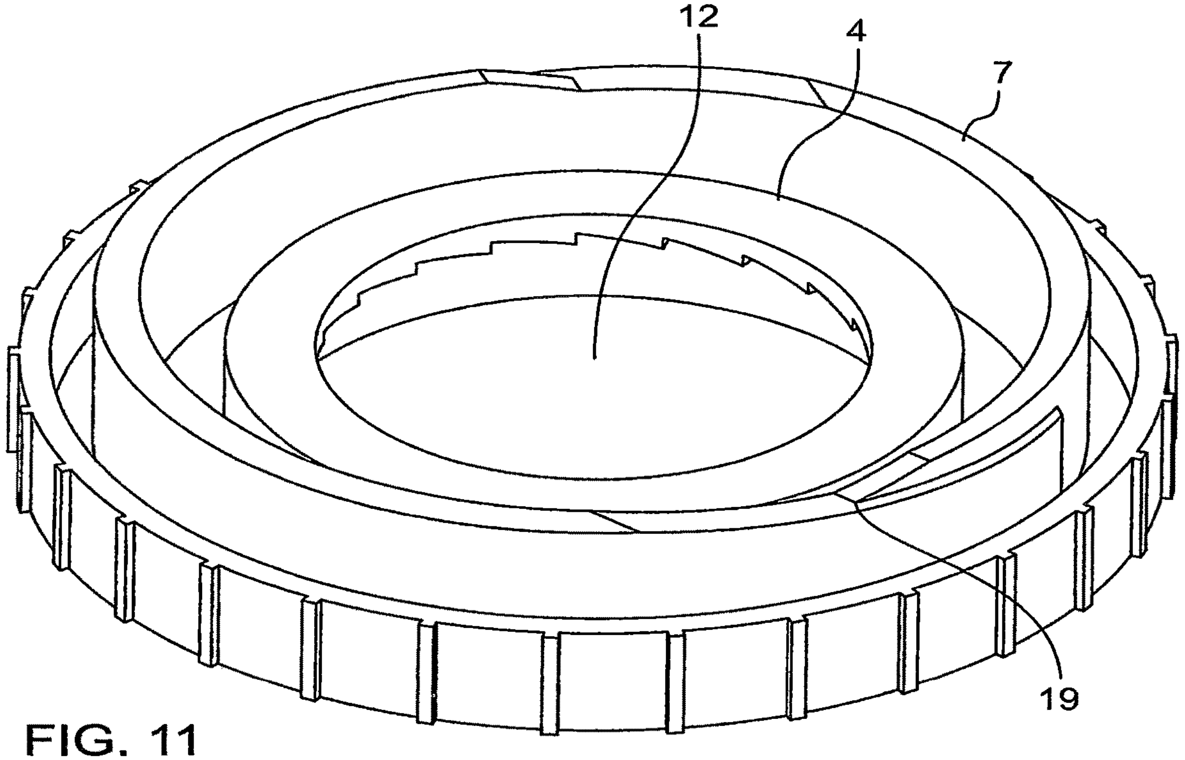

FIG. 11 is an upper perspective view of an embodiment of the rotating bottom piece.

Figure 12:
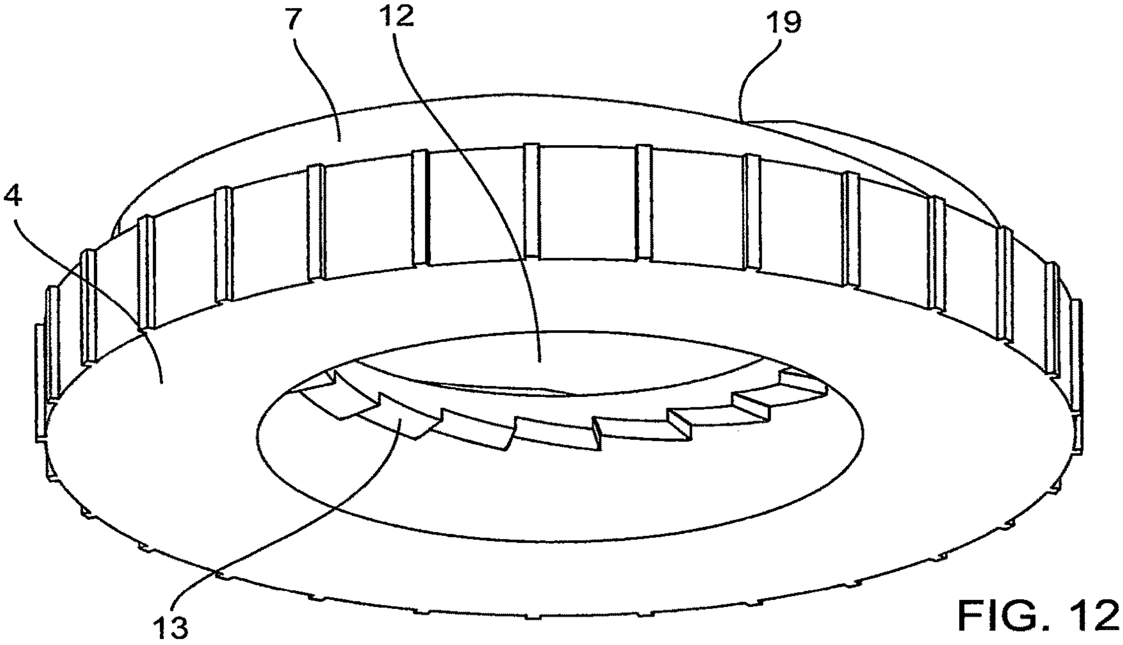

FIG. 12 is a lower perspective view of an embodiment of the rotating bottom piece.

Figure 13:
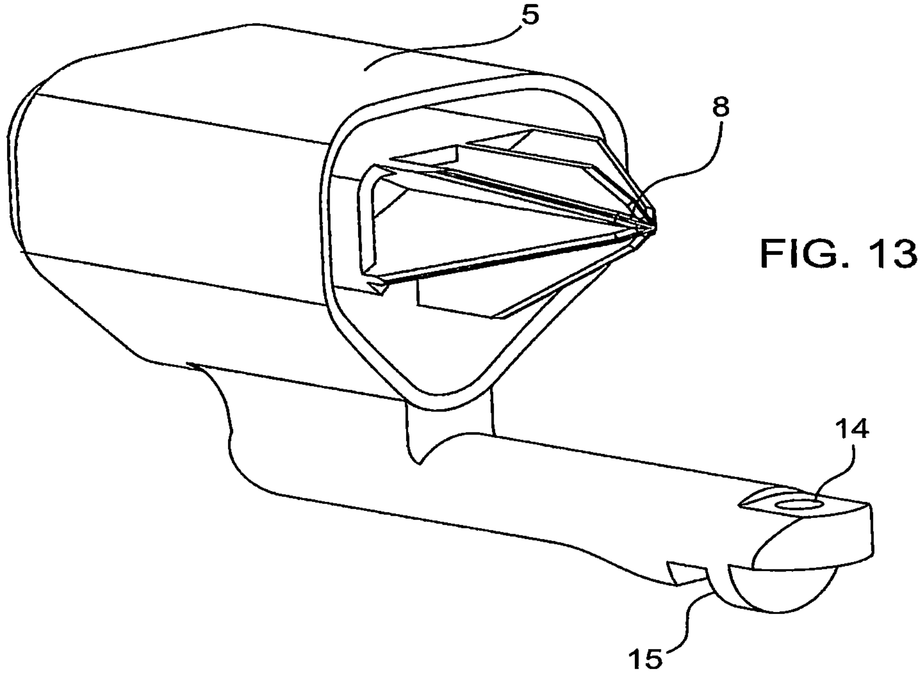

FIG. 13 is an upper front perspective view of an embodiment of the movable spout.

Figure 14:
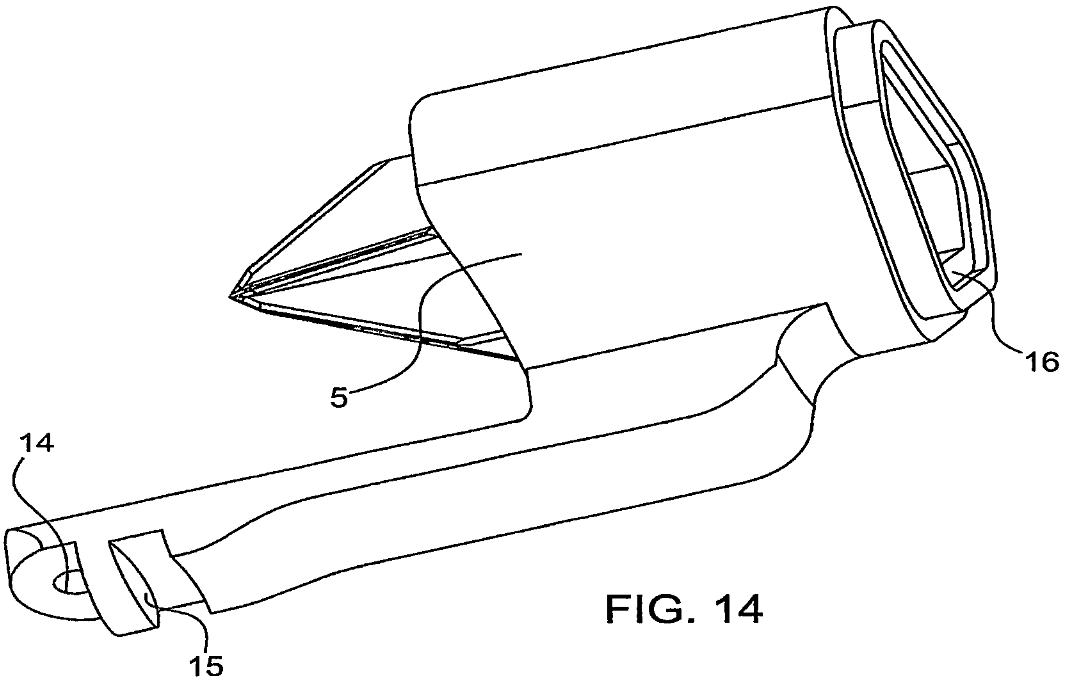

FIG. 14 is a lower rear perspective view of an embodiment of the movable spout.

Figure 15:
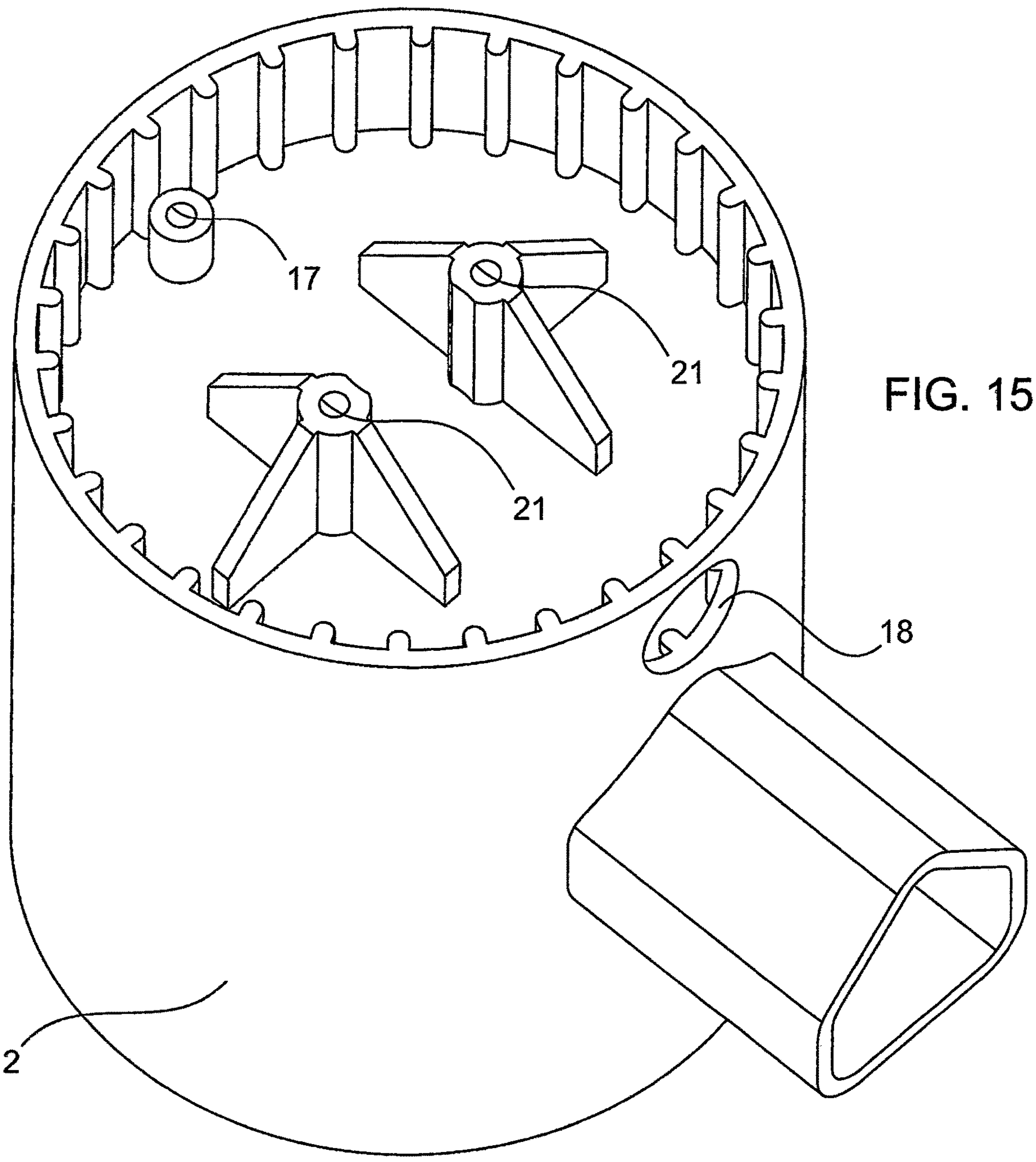

FIG. 15 is an upper perspective view of the bottom of an embodiment of the main body.

Figure 16:
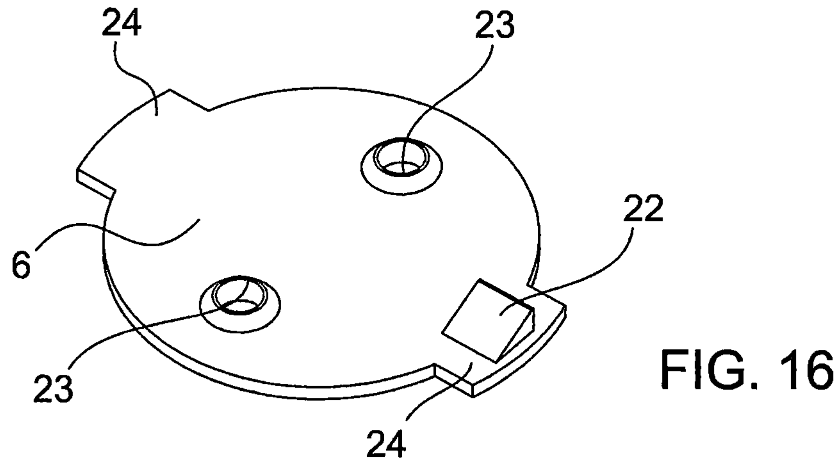

FIG. 16 is an upper perspective view of an embodiment of the spring plate.

Figure 17:
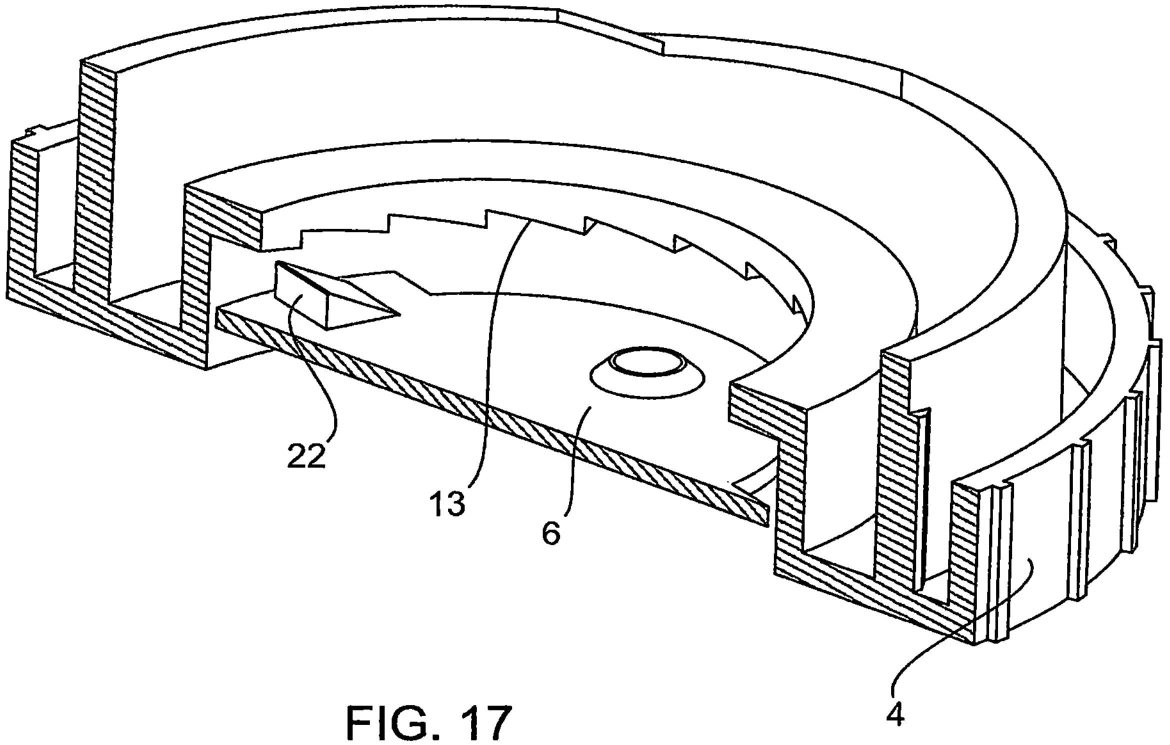

FIG. 17 is a side perspective half section view of an embodiment of the spring plate and its interaction with the rotating bottom piece.

DETAILED DESCRIPTION OF THE DRAWINGS

FIGS. 1 through 10 illustrate a beverage container piercing device in accordance with the present subject matter. The device includes main body 2 having a generally circular perimeter and side channel 20 having a generally triangular perimeter. The primary purpose of main body 2 is to house the beverage container 1. The secondary purpose of main body 2 is to facilitate the flow of liquid from the beverage container 1 through channel 20, and movable spout 5.

Main body 2 may be fabricated from several different materials and present in several different sizes. The main purpose of main body 2 is to contain beverage container 1. Beverage container 1 may come in several different sizes. Main body 2 may be fabricated in any size that will facilitate smaller or larger beverage containers. In its preferred embodiment, main body 2 is composed of plastic, but it also may be made of metal, ceramic, or any other material that would serve the purpose of housing a beverage container in a sturdy cylindrical housing.

The beverage container piercing device, in accordance with the present subject matter also includes movable spout 5. Movable spout 5 can be seated in two positions. Movable spout 5 can be seated in its extended position, FIG. 7 and FIG. 9, and its retracted position, FIG. 8 and FIG. 10. Movable spout 5, depicted in detail in FIG. 14, consists of a generally triangular spout, with hole 16 intended for the flow of liquid from beverage container 1. Movable spout 5, depicted in detail in FIG. 13, also includes holding notch 15, piercing end 8, and spring seat 14. Piercing end 8 is intended to pierce beverage container 1, allowing for the flow of liquid to begin. Piercing end 8 can be embodied in a variety of different shapes. In the preferred embodiment, piercing end 8 is generally shaped like a pointed cone. The pointed cone shape allows for an easy penetration of beverage container 1. The cone shape also allows for a large enough hole to be pierced through the beverage container to allow for the flow of liquid. The pointed end may be embodied in many different shapes sufficient to pierce a beverage container while still allowing liquid to flow around the pointed end while it is still inserted into the beverage container. The pointed cone shape may be solid or hollow. The pointed end may also be made of many different materials. The pointed end may be made of plastic, metal, ceramic, or any other material sufficient to pierce beverage container 1. There may be a gasket material placed between movable spout 5 and main body 2 to prevent spilling of liquid.

On the bottom of main body 2, depicted in detail in FIG. 15, is rear end spring holder 17, screw bosses 21, and channel 18. The bottom of main body 2 includes channel 18 for movable spout 5. Movable spout 5 slides along channel 18. The bottom of main body 2 is also composed of rear end spring holder 17. Rear end spring holder 17 is intended to hold tension spring 11 to main body 2. A screw may be inserted into rear end spring holder 17 to secure spring 11. The other end of tension spring 11 is held within movable spout 5 and spring seat 14. When movable pour spout 5 is pulled to its extended position, FIGS. 7 and 9, tension spring 11 holds tension between movable pour spout 5 and main body 2. When in its extended position, the tension caused by tension spring 11 between main body 2 and movable spout 5 is held in position by ridge 7 on rotating bottom piece 4 depicted in FIG. 11 and FIG. 12. Ridge 7 holds movable spout 5 in its extended position by seating itself into notch 15 in movable spout 5 until it is released into its retracted position caused by the rotation of rotating bottom piece 4. Movable spout 5 is released rapidly into its retracted position when notch 19 in rotating bottom piece 4 aligns itself axially with notch 15 in spout 5.

Rotating bottom piece 4, which contains ridge 7, is held in upward compression by spring plate 6, depicted in detail in FIG. 16. Spring plate 6 is comprised of a thin, flexible material. Spring plate 6 is held in place by 2 screws, using screw holes 23. The screws are fastened into bosses 21 in the main body 2. Spring plate 6 applies upward force to rotating bottom piece 4 via flaps 24 while still allowing it to extend downward when a downward force is applied to spring plate 6. This mechanism allows rotating bottom piece 4 to rotate axially around spring plate 6 as well as to temporarily extend downward when a downward force is applied. This downward force extension is necessary for function of click mechanism 22 and for seating ridge 7 of rotating bottom piece 4, into holding notch 15 of movable spout 5. The purpose of spring plate 6 is to ensure that rotating bottom piece 4 remains in contact with main body 2, while also allowing it to freely spin, to produce a clicking sound and also trigger movable spout 5 into its retracted position.

Rotating bottom piece 4 is depicted in detail in FIG. 11, FIG. 12 and FIG. 17. Rotating bottom piece 4 comprises wedges 13, ridge 7, and notch 19. During gameplay, rotating bottom piece 4 rotates around its center axis 12. Wedges 13 are intended to produce the audible click when the users are playing the game through their interaction with click mechanism 22 on spring plate 6. Notch 19 is intended to release movable spout 5 from its extended position to its retracted position. As rotating bottom piece 4 is rotated counterclockwise, notch 19 slowly aligns with notch 15 to release pour spout 5 into its retracted position, thus piercing the beverage container. Rotating bottom piece 4 may have any number of notches 19. The number of notches 19, and the number of wedges 13 between notches 19, determines the effect of the apparent random nature of the device. Rotating bottom piece 4 may be rotated by hand in its preferred embodiment or facilitated via another method like a push button or lever arm, like a slot machine. These features may be incorporated into main body 2 of the device. When rotated counterclockwise, rotating bottom piece 4 produces an audible clicking sound every time wedge 13 passes by click mechanism 22, depicted in FIG. 17. Click mechanism 22 is composed of a wedge that produces a clicking sound when wedge 13 passes by it during its rotation while playing the game. Click mechanism 22 also prevents rotating bottom piece 4 from rotating in the wrong direction through its interaction with wedges 13.

While best mode of the present invention has been illustrated and described in detail, it is to be understood that numerous modifications can be made to embodiments of the present invention without departing from the spirit thereof.

What is claimed is:

1. A drinking apparatus, comprising:

a body portion comprising a receptacle having an inner cavity that is dimensioned to receive and retain a beverage container inserted in an upright orientation within the inner cavity, the body portion having a lower area providing an access to the inner cavity;

a piercing mechanism located near the lower area that is insertable through the access to the inner cavity, wherein the piercing mechanism is under tension when in an extended position outside the access to the inner cavity;

a ratcheting mechanism having a rotatable bottom piece comprised of wedges, the rotatable bottom piece also having a notch, the ratcheting mechanism configured to enable the piercing mechanism to draw through the access and into the inner cavity thus piercing the beverage container upon rotating the bottom piece to align the notch to a designated alignment position; and a spout located proximate to the piercing mechanism that is configured to pour a beverage from the pierced beverage container.

2. The apparatus of claim 1, wherein the body portion has an open top portion configured to allow access to a top surface of the inserted beverage container.

3. The apparatus of claim 1, wherein the wedges of the ratcheting mechanism cause an audible click with each rotational movement from one retained position of the ratcheting mechanism to an adjacent position.

4. The apparatus of claim 1, wherein the piercing mechanism and spout travel together along a channel positioned near the access to the inner cavity.

5. The apparatus of claim 1, wherein the piercing mechanism is obscured from view when inside the inner cavity of the body portion and the beverage container is within the inner cavity.

6. The apparatus of claim 1, wherein the piercing mechanism and spout travel together, and the rotatable bottom piece includes a ridge that seats into a corresponding notch of the spout to hold the spout and piercing mechanism in the extended position.

7. The apparatus of claim 1, wherein the ratcheting mechanism is positioned beneath the body portion and shares a center axis with the body portion.

8. A drinking apparatus, comprising:

a main body having an interior dimensioned to receive and retain a beverage container, the main body having a substantially cylindrical surface, a bottom portion, and an aperture in the cylindrical surface;

a moveable spout disposed proximate the bottom portion of the main body and connected to the main body near the aperture by a side channel along which the movable spout slides back and forth;

a piercing end attached to the moveable spout, the piercing end dimensioned to pass through the aperture and contact the beverage container retained in the main body;

a tension spring that draws the moveable spout and piercing end along the side channel closer to the beverage container retained within the main body;

a rotatable bottom piece located below the main body and attached to the main body so as to be rotatable about a center axis shared between the main body and the rotating bottom piece, the rotatable bottom piece comprising wedges disposed in a circular configuration along a surface of the rotatable bottom piece; and a plate having a click mechanism disposed thereon and configured to make contact with at least one of the wedges when the plate is brought into contact with the rotating bottom piece, wherein an audible click is generated responsive to rotating the bottom piece about the center axis, each time the click mechanism is brought into contact with a wedge of the bottom piece.

9. The apparatus of claim 8, wherein the main body has an open top portion configured to allow access to a top surface of the inserted beverage container.

10. The apparatus of claim 8, wherein each audible click responsive to rotational movement of the bottom piece designates a transition from one retained position to an adjacent position.

11. The apparatus of claim 8, wherein the piercing end and spout travel together along the side channel.

12. The apparatus of claim 8, wherein the piercing end is obscured from view when inside an inner cavity of the main body and the beverage container is within the inner cavity.

13. The apparatus of claim 8, wherein the rotatable bottom piece includes a ridge that seats into a corresponding notch of the movable spout to hold the spout and piercing end in an extended position under tension by the tension spring.

14. The apparatus of claim 8, wherein the rotatable bottom piece includes a notch, wherein alignment of the notch of the rotatable bottom piece with the notch of the moveable spout releases the moveable spout from the extended position drawing the piercing end through the aperture in the cylindrical surface.

15. A drinking apparatus, comprising:

a beverage container receiving means;

a beverage container piercing means connected to the receiving means; and a ratcheting means connected to the receiving means and the piercing means, the ratcheting means having a rotatable bottom piece comprised of wedges, the rotatable bottom piece also having a notch;

wherein the ratcheting means is configured to enable the piercing means to draw into the beverage container receiving means, wherein the rotatable bottom piece is rotatable between a minimum and maximum number of audible clicks before the piercing means pierces a beverage container retained within the receiving means.

16. The apparatus of claim 15, wherein the receiving means has an open top portion configured to allow access to a top surface of an inserted beverage container.

17. The apparatus of claim 15, wherein engagement of a click mechanism with a select wedge of the rotatable bottom piece makes an audible click designating rotational movement from one position of the rotatable bottom piece to an adjacent position.

18. The apparatus of claim 15, wherein the piercing means travels along a channel positioned near the receiving means.

19. The apparatus of claim 15, wherein the piercing means is obscured from view when inside an inner cavity of the beverage container receiving means when a beverage is placed in the beverage container receiving means.

20. The apparatus of claim 15, wherein the rotatable bottom piece includes a ridge that seats into a corresponding notch of the piercing means to hold the piercing means in an extended position.

* * * * *